United States Patent [19]

Cullen

[11] Patent Number: 5,775,862
[45] Date of Patent: Jul. 7, 1998

[54] THREADED DEVICE FOR RECEIVING AN EXTERNALLY THREADED SCREW

[76] Inventor: John Prosper Cullen, 79 Brunskill Avenue, Wagga Wagga, New South Wales, 2650, Australia

[21] Appl. No.: 722,208
[22] PCT Filed: Apr. 13, 1995
[86] PCT No.: PCT/AU95/00214
 § 371 Date: Dec. 16, 1996
 § 102(e) Date: Dec. 16, 1996
[87] PCT Pub. No.: WO95/28572
 PCT Pub. Date: Oct. 26, 1995

[30] Foreign Application Priority Data

Apr. 13, 1994 [AU] Australia .............. PM5006/94
Dec. 14, 1994 [AU] Australia .............. PM0056/94

[51] Int. Cl.$^6$ .................. F16B 37/08; F16B 37/16
[52] U.S. Cl. .................. 411/433; 411/437; 411/527
[58] Field of Search .................. 411/433, 437, 411/525, 526, 527

[56] References Cited

U.S. PATENT DOCUMENTS

| | | |
|---|---|---|
| 2,279,169 | 4/1942 | Kost .................. 411/527 |
| 2,373,312 | 4/1945 | Hughes .................. 411/527 |
| 2,377,694 | 6/1945 | Judd .................. 411/527 X |
| 2,401,672 | 6/1946 | Tinnerman .................. 411/437 |
| 3,037,221 | 8/1962 | Lanius, Jr. . |
| 3,298,270 | 1/1967 | Launay . |

FOREIGN PATENT DOCUMENTS

| | | |
|---|---|---|
| 0176267 | 4/1986 | European Pat. Off. . |
| 1950203 | 4/1971 | Germany . |
| 3041755 | 5/1981 | Germany . |
| 3246180 | 6/1984 | Germany . |
| 1192694 | 5/1970 | United Kingdom .................. 411/527 |

*Primary Examiner*—Neill R. Wilson
*Attorney, Agent, or Firm*—Sughrue, Mion, Zinn, Macpeak & Seas, PLLC

[57] ABSTRACT

Threaded device (18) useful in a bracket (10) for mounting electrical components. The device (18) has a flat spring element (25) with two pressed tongues (20) with adjacent free ends. The tongues carry half nuts (45) with threaded half circular openings which are adjacent, so as to substantially define a threaded opening. A screw may be passed axially into the threaded opening so as to press the half nuts (45) apart against the bias of the tongues (20), without rotating the screw. On subsequent rotation of the screw, the half nuts (45) are drawn together by spring bias of the tongues (20) to enable the screw to threadedly engage the half nuts (45).

9 Claims, 5 Drawing Sheets

5,775,862

1
THREADED DEVICE FOR RECEIVING AN EXTERNALLY THREADED SCREW

BACKGROUND OF THE INVENTION

This invention relates to a threaded device. More specifically, the invention provides an improvement in threaded devices designed for engagement with a threaded screw upon insertion of the screw in the axial direction thereof.

In one aspect, the invention provides a threaded device for receiving an externally threaded screw, the device having an engaging portion which is biased to a position at which it threadedly engages the screw when received in the device, but movable against said bias under engagement by, and axial movement of, the screw with respect to the device, to enable the screw to pass the engaging portion without rotating the screw.

SUMMARY OF THE INVENTION

Preferably, the engaging portion is resiliently biased to said position.

The engaging portion may comprise a leaf spring.

Preferably, there is more than one engaging portion. For example, there may be two, three or four engaging portions arrayed about the location of the axis of the screw when received by the device.

The free end of the or each engaging portion may be part threaded for threadedly engaging the screw. Where there is more than one engaging portion, each may have a part threaded free end, the free ends being configured so as, together, to substantially fully circumferentially and threadedly engage the screw when threadedly received by the device.

The device may have a base portion having an opening through which the screw may extend to be engaged by the or each engaging portion. Where the engaging portions are provided as leaf springs, the leaf springs may be secured to a rear face of the base member, the screw in use being passed through the opening from a front face of the base member to be engaged by the engaging portions.

Where the engaging portions are in the form of leaf springs, these may extend from locations at which they are fixed to the rear face, inwardly towards the axis of the screw member when received, and rearwardly from the locations where they are fixed to the rear face, to free end portions which in use engage the screw. The or each engaging portion may be movable in the rearward direction away from said rear face when engaged by the screw for movement to the position at which axial movement of the screw therepast is permitted without rotating the screw. The free ends may also be movable in the opposite direction, towards the rear face, under screwing up action of the screw so that, for example, the or each portion is substantially flush with the rear face when the screw is tightened.

The invention is particularly, but not exclusively adaptable for use in connection with brackets for fixing of electrical fittings such as power points and switches.

BRIEF DESCRIPTION OF THE DRAWINGS

The invention is further described by way of example only with reference to the accompanying drawings in which.

2

Figure 1:
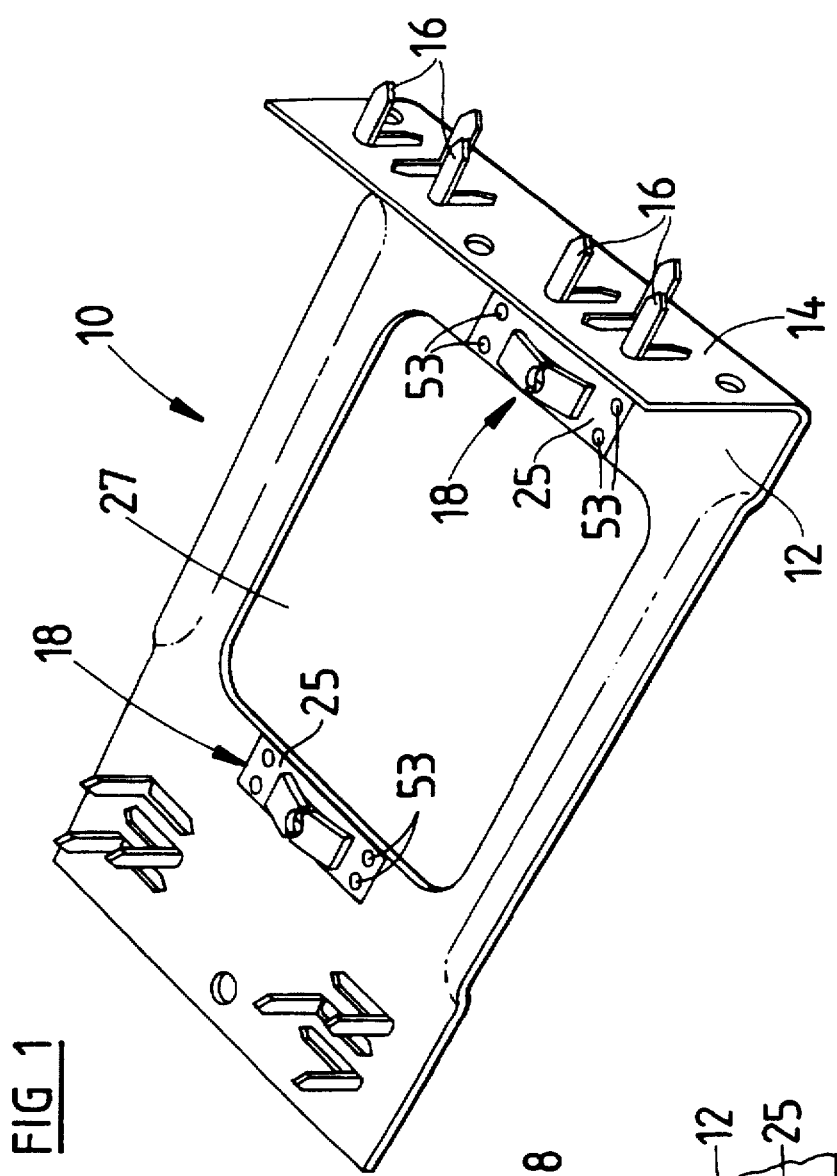
FIG. 1 is a rear perspective view of a bracket for fixing of electrical equipment.
Figure 2:
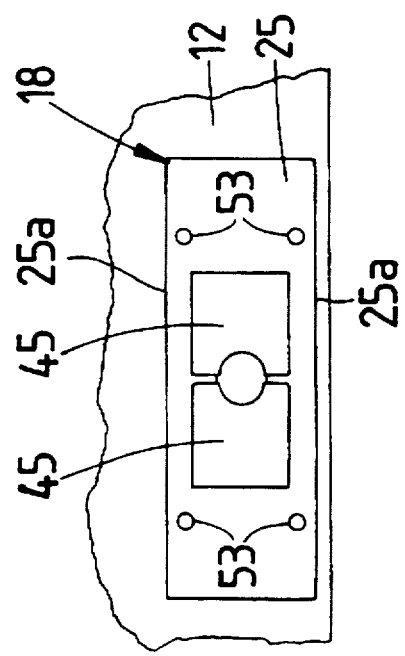
FIG. 2 is an enlarged fragmentary view of a rear part of the bracket, showing a threaded device formed in accordance with the invention.
Figure 3:
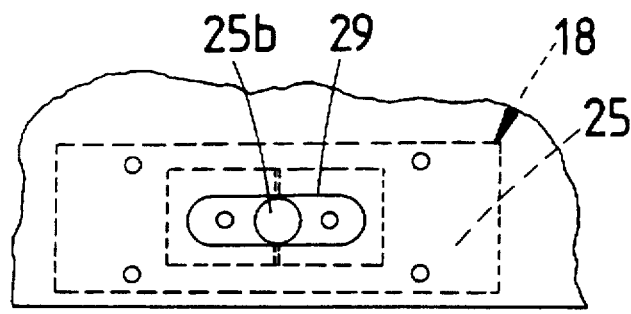
Figure 4:
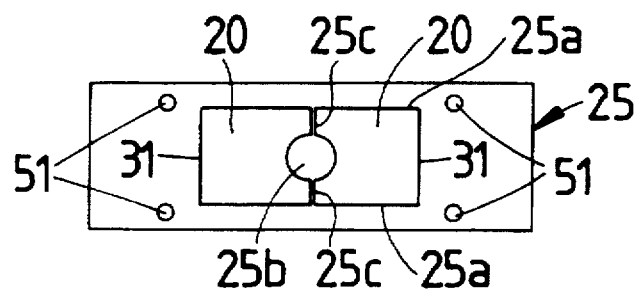
Figure 5:
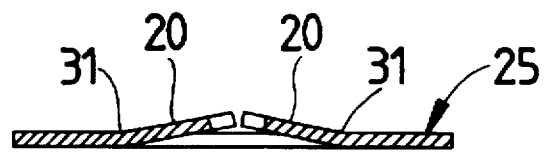
Figure 10:
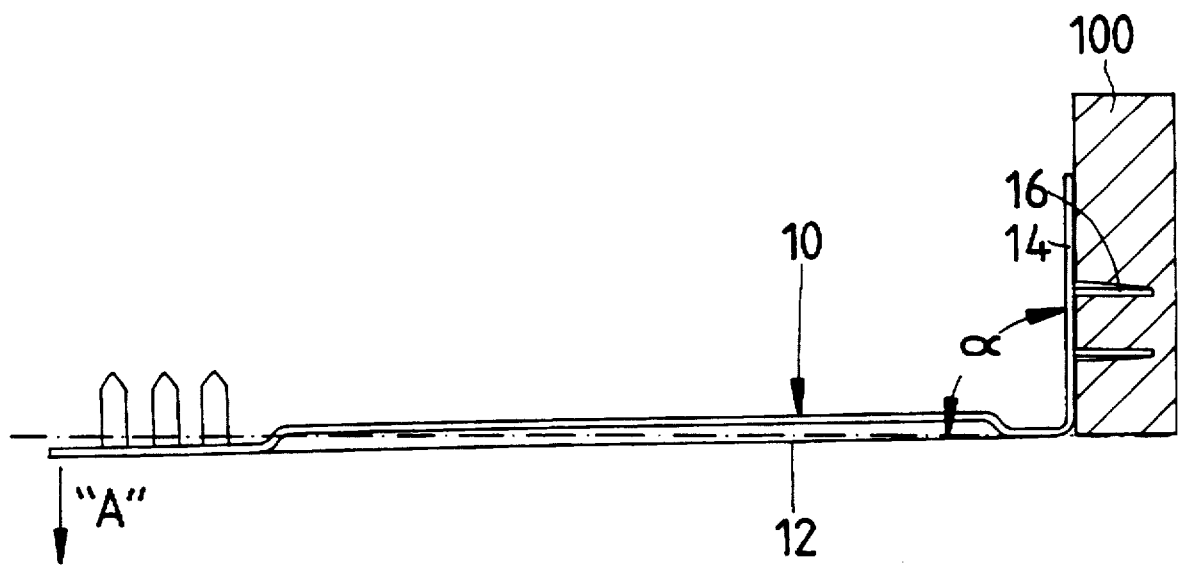
Figure 11:
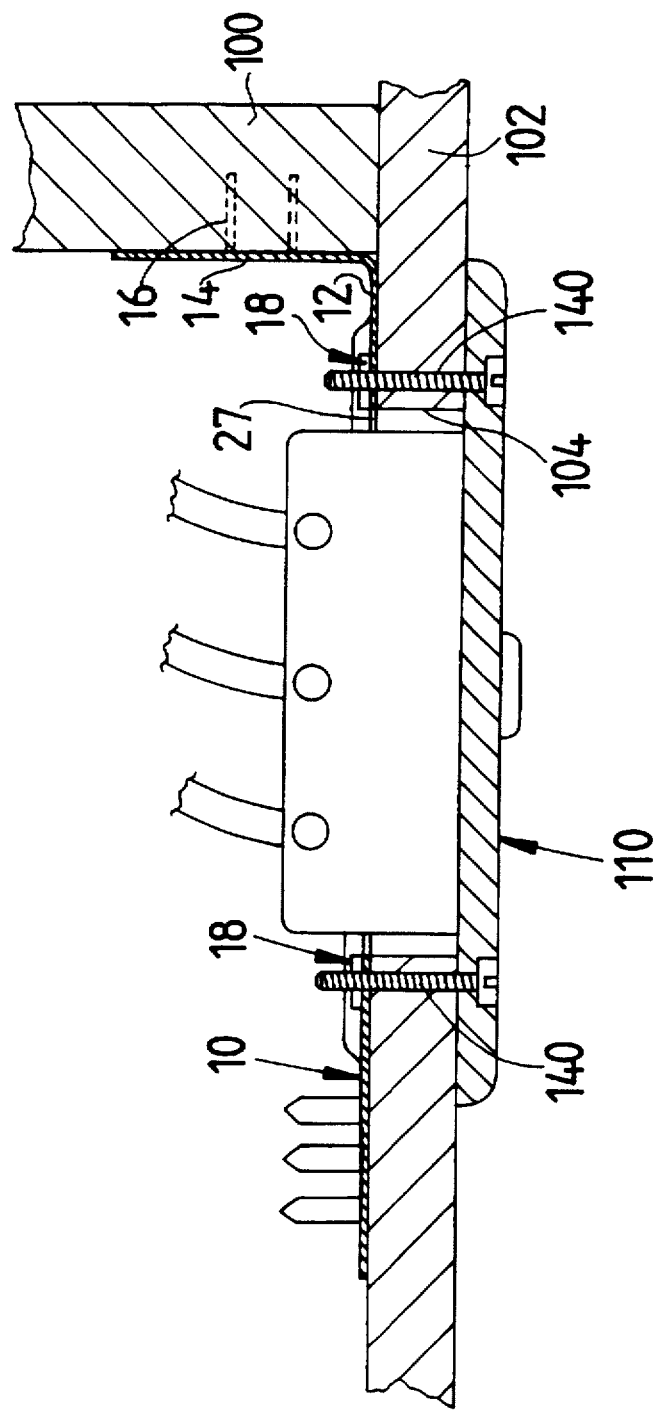

FIG. 3 is a view like FIG. 2 but showing a front part of the bracket;

FIG. 4 is a plan view of a spring element incorporated into the threaded device of FIG. 2;

FIG. 5 is a lengthwise cross section of the spring element of FIG. 4;

FIGS. 6 to 9 are cross sectional views illustrating the operation of the threaded device of FIG. 2;

FIG. 10 is a plan view of the bracket of FIG. 1 in use, prior to fixing of a switch thereto;

FIG. 11 is a view like FIG. 10, but showing a final fixed state of the bracket.

Figure 6:
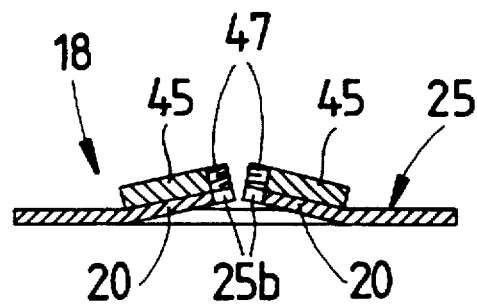
Figure 7:
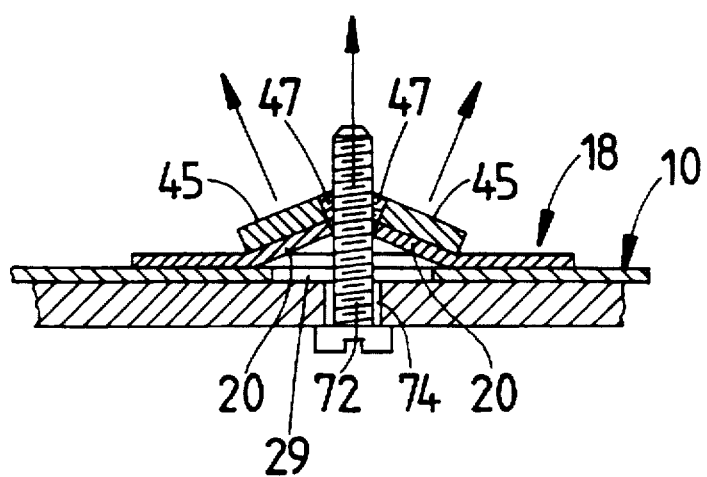
Figure 12:
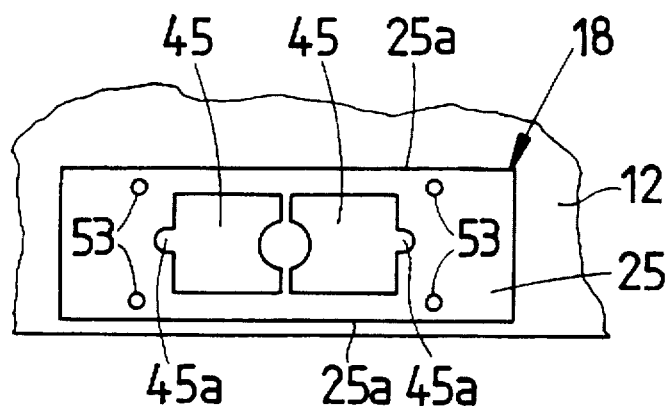
Figure 13:
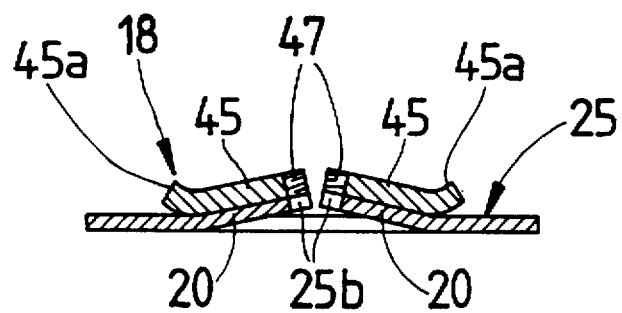
Figure 14:
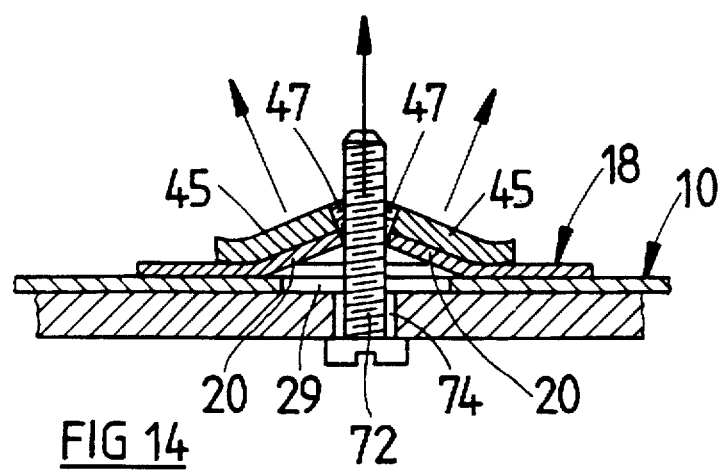

FIG. 12 is a view like FIG. 2, but showing a modified threaded device formed in accordance with the invention; and FIGS. 13 and 14 are views like FIGS. 6 and 7 respectively but illustrating the operation of the modified threaded device of FIG. 12.

DETAILED DESCRIPTION OF THE DRAWINGS

The bracket 10 shown in FIG. 1 is formed of sheet metal having a major portion 12 of generally planar form and a planar end portion 14, formed by bending from a metal blank. As shown in FIG. 11, the portion 14 has, stamped out and outwardly bent nail like portions 16 to permit the bracket to be fixed to, for example, a wall stud 100 so that the portion 12 extends in parallel relation to, and immediately behind, an outer panel 102 of the wall. The panel 102 is formed with an opening 104 which is aligned with an opening 27 in portion 12 of the bracket 10. In accordance with usual practice, electrical fittings such as the switch 110 shown in FIG. 11 can be fixed on the panel 102 by positioning it over the panel opening and screwing screws 140 through openings in the fitting, through drilled holes in the panel, and thence to engage threaded recesses formed in portion 12. In the present instance, these threaded portions are defined by threaded devices 18 of like form as shown in FIG. 1. There is a separate device 18 positioned to each respective side of opening 27 in portion 12 of the bracket.

Referring to FIGS. 2 and 3, the device 18 shown comprises a spring element 25 which carries two half nuts 45.

The spring element 25 is shown in more detail in FIGS. 4 and 5. It is formed of flat spring steel which has been stamped and cut to form two tongues 20. In particular, the element 25 is of generally elongate rectangular form and is provided with two cuts 25a parallel to and spaced somewhat inwardly from the respective longer side edges of the element 25. A central opening 25b is provided. From this opening 25a, respective cuts 25c are made to respective ones of the cuts 25a. The tongues 20 are thus formed one to either side of the opening 25b, having free ends defined at the cuts 25c and side edges defined by the cuts 25a. The tongues 20 are anchored to the remainder of the element 25 at ends opposite the free ends. The tongues 20 are bent out of the plane of the remainder of the element 25 in the fashion shown most particularly in FIG. 5. That is to say, the tongues extend at a small angle from fixed ends at transverse fold lines 31 in a rearward direction towards the free ends thereof.

The half nuts 45 are secured such as by welding or riveting one to each of the tongues 20. These each have half circular openings 47 at free ends thereof aligned with the end portions of the tongues which define the opening 25b.

The element 25 has stamped out apertures 51 and is secured on the back of the portion 12 of bracket 10 by rivets 53 extending through these and through aligned openings (not shown) in the portion 12 of bracket 10. Portion 12 has an opening 29 which is aligned with the opening 25b and the corresponding threaded opening defined by the two adjacent half openings 47.

Figure 8:
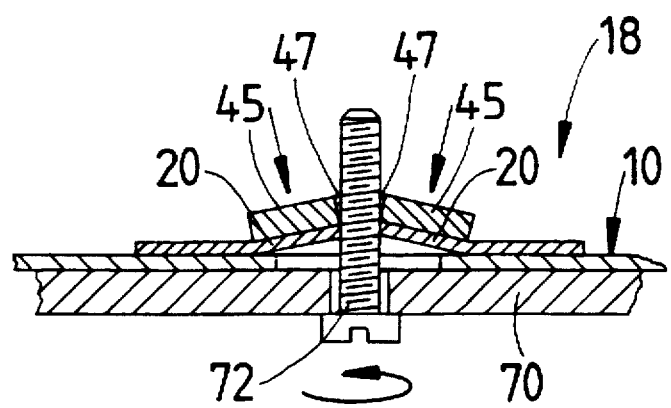
Figure 9:
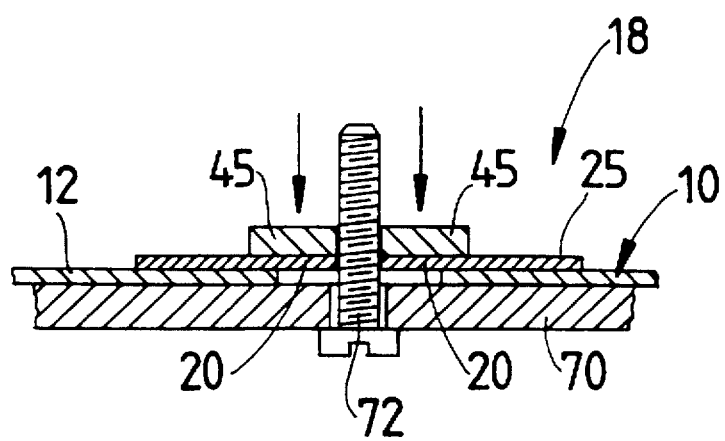

FIGS. 7, 8 and 9 illustrate steps in securing the bracket to for example a wall panel 70, by use of a screw 72 which passes through an opening 74 in the panel thence through the aligned opening 29 in the bracket to be received by the device 18.

In the first step, the shank of the screw is pushed through the openings 74 and 29 so that the end of the screw shank engages free end portions of the half nuts 45 and pushes these laterally outwardly and rearwardly as shown in FIG. 7. This action takes place against the resilient bias applied to the half nuts 45 by virtue of the resilient tongues 20. In this way, it is possible to push the screw 72 fully home so that the head thereof bears against the outer surface of the panel 70, without rotating the screw. Then, in the next step shown in FIG. 8, the screw 72 is rotated so that the external thread on the shank of the screw engages part threads of the threaded half openings 47 of the two half nuts 45. Under such rotation, the half nuts and resilient tongues 20 are drawn inwardly towards the axis of the screw thread and forwardly towards the panel 70. Under continued rotation, the position is finally reached at FIG. 9 where the half nuts are brought, against the resilient bias of the tongues 20, to a linearly aligned condition where the tongues 20 are likewise brought forward to be coplanar with the remainder of the element 25. At this point, further movement of the half nuts 45 in the forward direction is prevented by engagement of the tongues with the rear of the portion 12 of the bracket 10, and continued rotation of the screw 72 causes tightening of the screw to effect secure holding as between the panel 70 and bracket 10.

The described arrangement has been found particularly satisfactory in that the inward and forward swinging action of the tongues 20 and attached half nuts 45 during screwing up brings about a particularly secure threaded engagement and holding action. On the other hand, the outward and rearward swinging of the half nuts which is permitted by simply pressing the screw 72 inwardly as shown in FIG. 7 facilitates quick positioning of the screw 72 for tightening up. In that regard, it is customary to provide brackets, switch gear or like electrical fittings with rather long screws 72 to accommodate the maximum thickness of panels and electrical equipment to be secured which is likely to be encountered in everyday use. It is particularly tedious to have to fully screw up each screw into the receiving threaded openings of conventional brackets. On the other hand with the described construction, only a few turns of the screw are required for tightening of the screw, regardless of the thickness of panels and associated electrical equipment to be affixed.

The described bracket 10 is, as mentioned, designed to be affixed to a wall stud. Referring again to FIG. 10, it will be noted that the angle between the portions 12 and 14 of the bracket 10, shown as α in FIG. 10, is preferably made more than 90°, such as in the range 91° to 95°. Then, the bracket, when fixed to the stud 100, will extend with the portion 12 projecting somewhat further in a forward direction (arrow "A") than the end thereof which joins the portion 14 and the bracket. Then, when the panel 102 is subsequently installed over the front of the stud and the bracket, the free end of portion 12 is pushed rearwardly against resilience of the bracket so as to ensure that the portion 12 lies flush against the panel 102 as shown in FIG. 11. This has the advantage that when screws 140 are to be passed through the panel 102 to engage the threaded devices 18, there is less prospect that the bracket will, through fixing irregularities or lack of squareness of the stud 100, be spaced away from the rear face of the panel 102, which may render it difficult to locate the screw threaded devices 18. This improvement may be applied even where conventional screw threaded openings are provided in the bracket 10 instead of the devices 18.

Thus, in a further aspect of the invention there is provided a bracket for fixing electrical components to a panel, comprising first and second portions extending at an angle to each other, the first portion being arranged to lie flush against the rear face of said panel when the bracket is fixed in position by securing the second, then rearwardly extending portion, of the bracket to a surface extending generally normally to and rearwardly from the panel, wherein the bracket exhibits resilience and the two portions are arranged to extend at an angle of slightly more than 90° to each other. In particular, the said angle may be in the range 91° to 95°.

The modified form of the threaded device 18 shown in FIGS. 12, 13 and 14 is similar to that above described and, in these Figures, like reference numerals devote like components to those described in FIGS. 1 to 11. In this case, however, the half nuts 45 each have small projections 45a which extend outwardly from the ends thereof adjacent respective fold lines 31 of the spring element 25, and over those fold lines. As viewed from the side, the projections extend upwardly from the locations where they join the remainders of the half nuts to free ends of the projection, so as to be inclined at a small angle to the planes of the remainders of the half nuts. This angle is such that in the "rest" position of FIG. 13, the projections 45a also extend away at a small angle to the adjacent and underlying parts of the spring element 25.

The projections act to limited the extent of outward and "parting" movement of the half nuts when a screw is inserted as in FIG. 14. Thus, under action of the screw, the half nuts tilt only to the point where, as shown, the projections are rotated as to be brought into engagement with the adjacent parts of the spring element 25.

The described construction has been advanced merely by way of explanation, and many modifications and variations may be made thereto without departing from the spirit and scope of the invention as defined by the appended claims.

What is claimed is:

1. A threaded device for receiving an externally threaded screw, the device having a base portion and an engaging portion secured thereto, said base portion having an opening through which a screw may extend to be engaged by the engaging portion, said engaging portion being in the form of a leaf spring which extends from a substantially fixed location to a free end and which is resiliently biased to a position at which, at the free end, it threadedly engages the screw when received in the device by pressing the screw through said opening, the engaging portion being movable against said bias under engagement by, and axial movement of, the screw with respect to the device, to enable the screw to pass the engaging portion without rotating the screw, the engaging portion having an abutment surface positioned thereon at a location spaced from said substantially fixed location in the direction away from said fixed end, and which is arranged to be brought into engagement with the base portion of the threaded device to limit the movement of the engaging portion against said base under engagement by, and axial movement of, the screw.

2. A threaded device according to claim 2, wherein there is more than one engaging portion.

3. A threaded device according to claim 2 wherein there are two, three or four engaging portions arrayed about the location of the axis of the screw when received by the device.

4. A threaded device according to claim 3 wherein the free end of the or each engaging portion is part threaded for threadedly engaging the screw.

5. A threaded device according to claim 4 wherein each said engaging portion has a part threaded free end, the free ends being configured so as, together, to substantially fully circumferentially and threadedly engage the screw when threadedly received by the device.

6. A threaded device as claimed in claim 1, the leaf springs being secured to a rear face of the base member, the screw in use being passed through the opening from a front face of the base member to be engaged by the engaging portions.

7. A threaded device as claimed in claim 6, the leaf springs extending from locations at which they are fixed to the rear face, inwardly towards the axis of the screw member when received, and rearwardly from the locations where they are fixed to the rear face, to free end portions which in use engage the screw.

8. A threaded device as claimed in claim 7 wherein the or each engaging portion is movable in the rearward direction away from said rear face when engaged by the screw for movement to the position at which axial movement of the screw therepast is permitted without rotating the screw.

9. A threaded device as claimed in claim 8 wherein the free ends are also movable in the opposite direction, towards the rear face, under screwing up action of the screw.

* * * * *